(12) United States Patent
Rasshofer et al.

(10) Patent No.: US 8,798,927 B2
(45) Date of Patent: Aug. 5, 2014

(54) METHOD OF ALIGNING A SWIVELABLE VEHICLE SENSOR

(75) Inventors: Ralph Helmar Rasshofer, Aichach (DE); Dirk Ehmanns, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 744 days.

(21) Appl. No.: 12/191,793

(22) Filed: Aug. 14, 2008

(65) Prior Publication Data

US 2008/0300733 A1 Dec. 4, 2008

Related U.S. Application Data

(63) Continuation of application No. PCT/EP2007/000969, filed on Feb. 5, 2007.

(30) Foreign Application Priority Data

Feb. 15, 2006 (DE) .................. 10 2006 006 850

(51) Int. Cl.
| | |
|---|---|
| *G08G 1/16* | (2006.01) |
| *G01S 13/93* | (2006.01) |
| *B60R 11/04* | (2006.01) |
| *G08G 1/01* | (2006.01) |
| *G08G 1/04* | (2006.01) |
| *G01S 13/86* | (2006.01) |
| *G01S 17/93* | (2006.01) |
| *G01S 19/42* | (2010.01) |
| *G01S 19/45* | (2010.01) |

(52) U.S. Cl.
CPC .............. *G01S 13/931* (2013.01); *B60R 11/04* (2013.01); *G08G 1/0133* (2013.01); *G08G 1/167* (2013.01); *G08G 1/04* (2013.01); *G01S 13/86* (2013.01); *G01S 15/83* (2013.01); *G01S 17/936* (2013.01); *G01S 19/42* (2013.01); *G01S 19/45* (2013.01); *B60R 2300/60* (2013.01); *B60R 2300/602* (2013.01); *B60R 2300/605* (2013.01); *B60R 2300/8093* (2013.01)
USPC .......... 701/523; 701/28; 701/117; 701/408; 701/431; 701/437; 701/444; 701/532

(58) Field of Classification Search
CPC .............. B60R 11/04; B60R 2300/60; B60R 2300/602; B60R 2300/605; B60R 2300/80; B60R 2300/802; B60R 2300/8026; B60R 2300/804; B60R 2300/8053; B60R 2300/8086; B60R 2300/8093; G01S 13/00; G01S 13/02; G01S 13/04; G01S 13/50; G01S 13/52; G01S 13/56; G01S 13/58; G01S 13/66; G01S 13/74; G01S 13/86; G01S 13/862; G01S 13/865; G01S 13/867; G01S 13/88; G01S 13/9029; G01S 13/91; G01S 13/93; G01S 13/931; G01S 15/00; G01S 15/02; G01S 15/025; G01S 15/04; G01S 15/06; G01S 15/08; G01S 15/50; G01S 15/52; G01S 15/523; G01S 15/58; G01S 15/66; G01S 15/87; G01S 15/88; G01S 15/8902; G01S 15/93; G01S 15/931; G01S 17/00; G01S 17/003; G01S 17/02; G01S 17/023; G01S 17/026; G01S 17/06; G01S 17/08; G01S 17/58; G01S 17/66; G01S 17/74; G01S 17/87; G01S 17/88; G01S 17/93; G01S 17/936; G01S 19/38; G01S 19/39; G01S 19/40; G01S 19/41; G01S 19/42; G08G 1/0104; G08G 1/0112; G08G 1/012; G08G 1/0133; G08G 1/0137; G08G 1/04; G08G 1/056; G08G 1/163; G08G 1/167; G08G 1/20; G08G 1/22; G08G 99/00
USPC .............. 701/1, 117, 28, 431, 437, 444, 523, 701/532; 340/435, 436, 437; 342/70
See application file for complete search history.

(56) References Cited

U.S. PATENT DOCUMENTS

| | | | |
|---|---|---|---|
| 5,562,336 A | | 10/1996 | Gotou |
| 5,646,614 A | * | 7/1997 | Abersfelder et al. ...... 340/932.2 |
| 6,624,782 B2 | * | 9/2003 | Jocoy et al. ..................... 342/70 |
| 6,753,804 B2 | * | 6/2004 | Miyahara ........................ 342/70 |
| 6,809,680 B2 | * | 10/2004 | Tojima ............................ 342/70 |
| 6,828,928 B2 | | 12/2004 | Dubrovin |
| 7,190,282 B2 | * | 3/2007 | Maemura et al. ............. 340/903 |
| 7,295,229 B2 | | 11/2007 | Kumata et al. |
| 7,643,911 B2 | * | 1/2010 | Ishihara et al. ................... 701/1 |
| 8,164,627 B1 | * | 4/2012 | Hahn ............................. 348/148 |
| 2002/0039295 A1 | | 4/2002 | Kobayashi et al. |
| 2004/0032493 A1 | | 2/2004 | Franke et al. |
| 2006/0028832 A1 | * | 2/2006 | Horii et al. .................... 362/514 |
| 2007/0222662 A1 | | 9/2007 | Toennesen et al. |
| 2008/0027607 A1 | * | 1/2008 | Ertl et al. ........................ 701/36 |

FOREIGN PATENT DOCUMENTS

| | | |
|---|---|---|
| DE | 196 02 622 A1 | 8/1996 |
| DE | 297 12 192 U1 | 12/1997 |
| DE | 101 39 150 A1 | 2/2002 |
| DE | 100 69 786 A1 | 6/2002 |
| DE | 102 27 221 A1 | 1/2004 |
| DE | 10 2004 004 4 | 8/2005 |
| DE | 103 49 210 A1 | 6/2006 |
| EP | 1 197 937 A1 | 4/2002 |
| EP | 1 323 570 A1 | 7/2003 |
| GB | 2 244 187 A | 11/1991 |
| JP | 2006-240499 A | 9/2006 |

OTHER PUBLICATIONS

International Search Report dated May 22, 2007 Four (4) pages.
German Office Action including English translation relevance dated Jan. 29, 2007 Nine (9) pages.

* cited by examiner

*Primary Examiner* — Jerrah Edwards
(74) *Attorney, Agent, or Firm* — Crowell & Moring LLP

(57) ABSTRACT

A method of aligning a vehicle sensor is provided. The sensor is arranged on a motor vehicle and is swivelable about at least one axis in the direction of an attention angle determined as a function of the actual driving situation. The presence of a traffic route leading into the probable driving route of the motor vehicle is detected, and the attention angle is selected such that the receiving range of the vehicle sensor resulting from the alignment in the direction of the attention angle at least partially contains the traffic route leading into the probable driving route of the motor vehicle.

16 Claims, 1 Drawing Sheet

METHOD OF ALIGNING A SWIVELABLE VEHICLE SENSOR

CROSS-REFERENCE TO RELATED APPLICATIONS

This application is a continuation of PCT International Application No. PCT/EP2007/000969, filed on Feb. 5, 2007, which claims priority under 35 U.S.C. §119 to German Application No. 10 2006 006 850.5, filed Feb. 15, 2006, the entire disclosures of which are expressly incorporated by reference herein.

BACKGROUND AND SUMMARY OF THE INVENTION

This invention relates to a method of aligning a vehicle sensor, which is arranged on a motor vehicle and is swivelable about at least one axis, in the direction of an attention angle determined as a function of the actual driving situation.

As a rule, modern motor vehicles have a plurality of vehicle sensors. These may also be used for the detection of objects in the vehicle surroundings. Vehicle sensors of many different operating principles (radar, lidar, infrared, ultrasound, etc.) are known. Most such vehicle sensors, particularly those designed for a large range, are limited to a relatively narrow aperture angle (+/−15 degrees) around a main beaming direction. Individual vehicle sensors can therefore often only cover a relatively small receiving range. When several sensors interact for covering larger receiving ranges, the number of required sensors will increase while the aperture angle of the sensors decreases.

In order to increase the effective receiving range of vehicle sensors, it is therefore known to use swivelable vehicle sensors. From European patent document EP 1 323 570 B1, it is known to align a vehicle sensor by swiveling on a motor vehicle in a time variable manner such that the probable driving route of the motor vehicle is covered as well as possible at any time. Further, it is known from German patent document DE 103 49 210 A1 to detect a potentially dangerous object and to control the swiveling motion of a swivelable vehicle sensor as a function of the characteristics of the dangerous object and of the alignment of the motor vehicle with respect to the latter. However, the above-mentioned devices and methods have the disadvantage that significant foreknowledge concerning potential danger still remains unutilized. A swivelable vehicle sensor is therefore not used in an optimal fashion, and recognizable danger may not be reliably detected.

It is an object of the invention to create a simple method by which the practical benefit of swivelable vehicle sensors is further increased.

The methods of the above-mentioned type known from the state of the art frequently aim at a covering of future locations by the sensor, that is, the covering of the probable driving route, of the motor vehicle by the sensor. However, this approach does not consider the fact that possibly dangerous objects, particularly other traffic participants with which the motor vehicle could collide, frequently are moving themselves. The speed of the dangerous objects may even be far higher than that of the motor vehicle itself. Particularly at junctions and intersections, the sensory monitoring of the probable driving route alone is therefore informative only to a limited extent.

As a rule, not all data are available that would be required in order to determine the existence and the movement of all dangerous objects in the environment of the motor vehicle. However, in many traffic situations, at least the traffic routes (for example, roads, streets, exits, lanes, bike paths, pedestrian paths) are known on which the dangerous objects could approach the vehicle. The invention is therefore based on the idea of an improved monitoring of these traffic routes.

According to the invention, the existence of a traffic route leading into the probable driving route of the vehicle is detected first. The vehicle sensor will then be swiveled such that its receiving range at least partly contains or covers the traffic route leading into the probable driving route of the motor vehicle. The attention angle, into whose direction the swivelable vehicle sensor is aligned, or the desired value of the attention angle in a control system or an automatic control system, will be correspondingly selected for this purpose.

Thus, in contrast to the state of the art, in the case of the method according to the invention, the swivelable vehicle sensor is surprisingly, at least in certain driving situations, specifically not used for monitoring the probable driving route of the motor vehicle but is aligned in a direction in which, including on the basis of foreknowledge concerning the surrounding traffic routes (such as the position and the course), potentially dangerous objects could be located—specifically on traffic routes leading in to the driving route.

In the sense of the invention, leading-in traffic routes are mainly all roads, streets, bridges, exits, etc. on which potentially dangerous objects, for example, another traffic participant, can approach the driving route of the motor vehicle. Individual driving lanes of such roads may also be traffic routes in the sense of the invention. If it is known, for example, that the motor vehicle is moving straight ahead on a first road and a second road leading laterally into the first road has two driving lanes which are typically traveled in opposite directions, it is contemplated to consider only the driving lane of the second road on which traffic participants typically approach the first road a traffic route in the sense of the invention (when motor vehicle traffic takes place on the right side of the road, usually the right traffic lane viewed in the driving direction).

The presence of leading-in traffic routes is preferably detected by use of map data of a navigation system. However, it may also be detected by use of independent vehicle sensors, for example, by a vehicle camera.

A leading-in traffic route in the sense of the invention may always either have the right of way or not have the right of way. The primary decisive factor is whether there is the possibility that a dangerous object on the respective traffic route is approaching the motor vehicle such that it could collide with the latter. Having the purpose of a particularly good detection of danger, the method according to the invention may be implemented such that, independent of any traffic control, any leading-in traffic route is monitored with respect to approaching dangerous objects. For example, even traffic participants may be detected early by the vehicle sensor, which could critically approach the motor vehicle only if they were to drive in the wrong direction on a one-way street or overlook a stop sign.

In contrast to such a safety-oriented interpretation, according to a preferred embodiment of the invention, foreknowledge concerning traffic control, particularly at the intersections of traffic routes, is also used for detecting the presence of leading-in traffic routes in the sense of the invention. Thus, for example, known right-of-way rules and the presence of traffic lights as well as their switching state may be taken into account. In this manner, for example, branching-off one-way streets can be excluded as leading-in traffic routes in the sense of the invention. Also, a street may be disregarded which will probably not be traveled by the motor vehicle and, in addition, has no right of way. As a result of foreknowledge of existing right-hand traffic, as a rule, the right-hand branch of a crossroad, into which the motor vehicle will probably turn off to the right, may also be excluded. When detecting all relevant leading-in traffic routes, country-specific regulations and behaviors (such as the German turning-off vs. the U.S. American turning-off while "joining the flow of traffic") can also be taken into account.

The foreknowledge concerning traffic control may, for example, originate from map data of a navigation system or may be available as additional information to such map data. Information concerning traffic control may be received by a motor vehicle, where the method according to the invention is used, also by way of teleservices and/or ad hoc networks which are established for the communication with other vehicles or stationary remote stations. Under certain circumstances, other traffic signs and/or traffic lights may be detected by camera and interpreted as an alternative or in addition.

In order to be able to determine which traffic routes lead into the probable driving route of the motor vehicle, it may be necessary or desirable—depending on the embodiment of the method according to the invention—that this probable driving route is known first. Preferably, the driving route of the motor vehicle is determined by the operating or switching state of a device for indicating the driving direction. It can also be determined by a route planned by a navigation system. Furthermore, vehicle sensors, for example, for detecting the steering angle, can be used for determining the probable driving route. A monitoring of the driver or a monitoring of the driver's behavior may also be performed for the purpose of recognizing his intention. Probabilistic and/or frequency-based approaches can also be used for determining the probable driving route. It can, for example, therefore be assumed that the driver approaching an intersection will travel a driving route which he has typically driven at the same time of day over a compared time period of several months. If different data are to be included in the determination of the planned driving route, intermediate results can in each case be calculated and compared with one another by way of a plausibility check.

The method according to the invention may also be advantageous in driving situations in which the probable driving route is not known or is not known with certainty. Thus, the knowledge of the probable driving route is therefore not a compelling prerequisite for the applicability of the method according to the invention. When the probable driving route is not known or is not known with certainty, for example, as a preventive measure, the respective leading-in traffic routes for all conceivable driving routes may be monitored. A simple hypothesis (for example, a straight-ahead drive) for the probable driving route can also be used. As a result, for example, all traffic routes which lead into the road actually traveled by the motor vehicle are to be considered to be leading-in traffic routes in the sense of the invention. The sequence of a sequential monitoring of leading-in traffic routes for several conceivable driving routes and/or the thoroughness of the respective monitoring may be oriented according to which of the conceivable driving routes is the most probable.

Even when several traffic routes are to be monitored for a single probable driving route, these will preferably be monitored sequentially. The sequence and/or the thoroughness of the respective monitoring may, for example, be determined according by which one of several conceivable driving routes leads first into the probable driving route.

The method according to the invention is advantageous particularly at intersections and side road crossings. When, for example, the motor vehicle approaches at a right angle a road that has the right of way and wants to turn into that road toward the right, according to the invention, the vehicle sensor can be aligned with the arm of the right-of-way road leading into the planned driving route from the left and can monitor this arm. In this manner, it can be checked whether a traffic participant is approaching from the left who has the right of way. The driver of the motor vehicle can then, for example, be warned.

For the exchange of information (for example, the utilization of sensor and map data and the output of a warning), the method according to the invention preferably communicates with other methods, particularly the method of detecting the environment and the method of assisting the driver, which are implemented in the same motor vehicle.

In order to be able to align the swivelable vehicle sensor in the case of the method according to the invention such that the leading-in traffic route is monitored in the desired fashion, the attention angle suitable for this purpose or a suitable variation in time of the latter has to be determined. For this purpose, the relative alignment of the motor vehicle with respect to the leading-in traffic route, as required, also the relative distance of the motor vehicle from the leading-in traffic route is of special significance. In principle, these quantities or their variation in time can be determined in many different fashions. According to a preferred embodiment of the present invention, the relative alignment of the motor vehicle with respect to the leading-in traffic route is determined by means of a determination of the absolute motor vehicle position and by means of map data of a navigation system.

However, as an alternative, the relative alignment of the motor vehicle with respect to the leading-in traffic route may also be determined by independent vehicle sensors. In this case, the independent vehicle sensors used for this purpose may comprise individual systems or several systems on the basis of radar, lidar, ultrasound, inertial platforms, gyroscopic sensors, terrestrial magnetic field sensors, as well as cameras (optical, near infrared, far infrared).

The two above-mentioned methods for the determination of the relative alignment of the motor vehicle with respect to the leading-in traffic route, if necessary, may also be mutually combined, for example, by a multi-stage approach or by the parallel calculation of partial results.

The determination of the relative alignment of the motor vehicle with respect to the leading-in traffic route can take place directly with the detection of the presence of the leading-in traffic route or may take place uncoupled from the latter. Correspondingly, also, for example, the presence of a leading-in traffic route can first be detected on the basis of map data, whereas the relative alignment of the motor vehicle with respect to the traffic route is determined in a camera-based manner.

As a rule, the method according to the invention will have the result that the vehicle sensor is not set to an attention angle that is constant with respect to time but to an attention angle that is variable with respect to time, because the movement of the motor vehicle with respect to the globally stationary traffic route requires a corresponding adaptation of the alignment of the vehicle sensor. This adaptation can take place while keeping pace with a correspondingly high updating rate. When the future driving route is at least partially known and/or predictable, for a high-quality and/or highly dynamic control of the swiveling motion, however, a variation in time can also be calculated ahead of time in a model-based manner for the attention angle.

In principle, only those parts of a leading-in traffic route which can be seen from the actual position of the vehicle sensor can be monitored by the method according to the invention. This will, as a rule, not be the entire traffic route but only an end of the traffic route facing the motor vehicle. Depending on the aperture angle of the vehicle sensor, it is also contemplated that, in certain driving situations, the monitoring of such an end of a leading-in traffic route cannot take place completely or reliably by the alignment of the vehicle sensor to a certain attention angle. This applies particularly in the case of a very narrow aperture angle of the vehicle sensor and a short distance from the leading-in traffic route or in the case of an extremely curved leading-in traffic route (such as rotary traffic). This problem can be solved in different fashions. For example, the monitoring can be limited to the part of the leading-in traffic route which is spatially the closest to the motor vehicle. The attention angle would then be selected such that the receiving range of the vehicle sensor resulting from the alignment in the direction of the attention angle contains the part of the traffic route leading into the probable driving route of the motor vehicle that is situated closest to the motor vehicle. However, an alignment to the part of the leading-in traffic route situated the closest may also take place first, in order to subsequently swivel the vehicle sensor to more remote parts. Thus, a larger part of the leading-in traffic route could be effectively monitored than the part that can be monitored in the case of a momentary observation.

The sensory monitoring of the vehicle environment according to the invention can also be distributed to several vehicle sensors. Correspondingly, certain responsibilities may arise for an individual vehicle sensor. In such a further development of the method according to the invention, the vehicle sensor will be aligned with a traffic route leading into the probable driving route of the motor vehicle only if it responsible for its monitoring. For example, a first swivelable vehicle sensor arranged on the right vehicle side may be responsible only for the monitoring of traffic routes which lead into the probable driving route of the motor vehicle from the right, while a second swivelable vehicle sensor arranged on the left vehicle side is responsible for monitoring traffic routes which lead into the probable driving route of the motor vehicle from the left.

Although a characteristic feature of the invention is the fact that a swivelable vehicle sensor is at least temporarily specifically not used for a monitoring of the probable driving route of the motor vehicle, the application of the method according to the invention definitely does not exclude the use of the swivelable vehicle sensor also temporarily, as required, even predominantly with respect to time, for a monitoring of the probable driving route of the motor vehicle (or for the monitoring of another direction, for example, the direction of the longitudinal vehicle axis). According to a preferred embodiment of the present invention, a particularly good utilization of the swivelable vehicle sensor is achieved in that, whenever no leading-in traffic route exists in the environment of the vehicle, its attention angle is selected such that the receiving range of the vehicle sensor resulting from the alignment in the direction of the attention angle largely contains the probable driving route of the motor vehicle. In the case of an above-described distribution of responsibility, the attention angle can always be selected such that the resulting receiving range largely contains the probable driving route of the motor vehicle when no leading-in traffic route, which falls into the range of responsibility of the respective vehicle sensor, is present in the environment of the motor vehicle.

Under certain circumstances, the efficiency of the method according to the invention can be increased when only those traffic routes are detected as leading-in traffic routes in the sense of the invention or are monitored as such which lead into the part of the future driving route which the motor vehicle will cover within a certain future time period (for example, within the following 15 seconds). The computing expenditures to be carried out by an arithmetic logic unit for the method according to the invention can thereby be reduced. Premature warnings to the driver can be avoided. A vehicle sensor, which is also used for the monitoring of the probable driving route of the motor vehicle, can be used for this purpose for a longer period of time.

The invention can already be used for controlling a vehicle sensor swivelable about a single axis but, without any problem, can be expanded to vehicle sensors swivelable about several axes. The monitoring of leading-in traffic routes can be further improved by a skillful controlling of a vehicle sensor swivelable about several axes. For example, inclinations of the motor vehicle (for example, as a result of loading) and/or slopes of the driving route of the motor vehicle as well as therefore also of the leading-in traffic routes can be compensated.

Other objects, advantages and novel features of the present invention will become apparent from the following detailed description when considered in conjunction with the accompanying drawings.

DETAILED DESCRIPTION OF THE DRAWINGS

Figure 1:
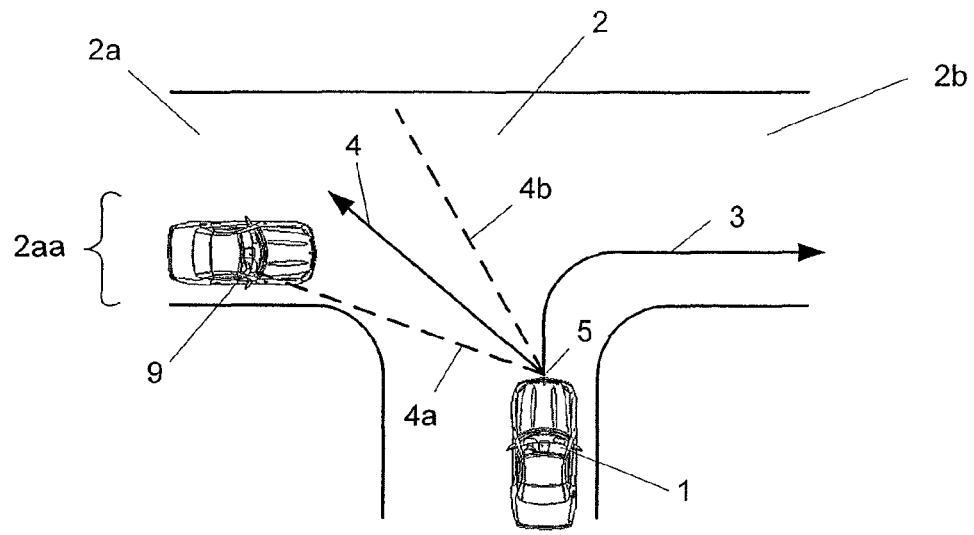
FIG. 1 is a schematic view of the use of a method according to the invention in a first driving situation.

FIG. 1 illustrates a motor vehicle 1 which is approaching a right-of-way road 2 approximately at a right angle. The motor vehicle 1 has a swivelable radar sensor 5. The latter is to be used for detecting traffic participants who have the right of way on traffic routes which lead into the planned driving route of the vehicle 1 in the sense of the invention. In the event of the detection of such traffic participants having the right of way, for example, an acoustic warning is emitted to the driver of the motor vehicle 1. Corresponding devices for the warning of the driver are provided in the motor vehicle 1 and are connected with the devices which participate in the implementation of the method according to the invention.

The radar sensor 5 has an aperture angle of +/−20 degrees which extends on both sides of a main beaming direction. FIG. 1 is a snapshot of when the radar sensor 5 is aligned in the direction of the main beaming direction 4. The aperture angle of the radar sensor 5 will then extend between the boundaries 4a and 4b illustrated in FIG. 1 as broken lines.

A driving motor is provided for the swiveling of the radar sensor 5. The actual swiveling angle can be detected by an angle sensor. An attention angle can be predefined as a desired value for the swiveling angle. The swiveling angle of the radar sensor 4 can be highly dynamically adjusted in a manner known per se by an automatic control in a closed control loop to the respectively predefined desired value or its variation in time. The generating of the attention angle or desired value takes place in an arithmetic logic unit according to a method of the invention, which arithmetic logic unit is assigned to the motor vehicle 1 and is not shown graphically in a separate manner.

The motor vehicle 1 includes a navigation system. The method according to the invention for determining the attention angle is coupled with this navigation system and can access its map data, the actual motor vehicle position as well as the planned route of an actual destination target of the navigation system. In addition, the method according to the invention can access the actual vehicle speed and the state of the driving direction indicators (turn signals).

The map data are expanded map data which contain additional information regarding the right of way rules on the indicated traffic routes.

In the embodiment of the method according to the invention described here, the planned route is considered to be the first preliminary information concerning the probable driving route of the motor vehicle. In the driving situation illustrated in FIG. 1, the planned route of the actual destination targeting indicates, for example, that the motor vehicle 1 will probably turn to the right into the road 2.

In addition, the driver of motor vehicle 1 has activated the right turn signal. This also allows the conclusion, as the second preliminary information, that a turning to the right is planned. This second preliminary information is compared with the information planned by the navigation system, that is, with the above-mentioned first preliminary information, in a plausibility check. When these two preliminary information indications correspond to one another, it is concluded as final information that a turning to the right is planned. The arrow 3 indicates the probable driving route.

In other embodiments of the invention, a conclusion can be drawn concerning the planned driving route only from the planned route or only from the state of the turn signal.

By means of the motor vehicle position, the actual driving speed and the map data of the navigation system, it is now determined by the method according to the invention that at least one traffic route contained in the map data leads into the driving route which the motor vehicle will cover within the next 20 seconds.

For the driving situation illustrated in FIG. 1, the left-hand road arm 2a is detected as a leading-in traffic route on which other traffic participants could approach the planned driving route 3. In contrast, the right-hand road arm 2b is not detected as a leading-in traffic route because, in the embodiment of the method according to the invention described here, it is taken into account that, in countries with right-hand traffic, when turning to the right, a collision with traffic participants approaching from the right cannot take place.

The expanded map data indicate that the road arm 2a has the right of way. It should therefore be monitored by the method according to the invention. Since it is also known from the expanded map data that the road arm 2a has two driving lanes which are typically traveled in opposite directions, and other traffic participants can therefore typically only approach the driving route 3 on driving lane 2aa, which is on the bottom (in the drawing of FIG. 1), the monitoring concentrates particularly on this driving lane 2aa.

In order to appropriately swivel the radar sensor 5 for this purpose, a determination of the relative alignment of the motor vehicle 1 with respect to the leading-in traffic route (or its "bottom" driving lane 2aa) is required. This determination takes place by use of the absolute motor vehicle position determined on GPS basis by the navigation system and by the map data of the navigation system. The latter show the geographic location, the measurements, etc. of the road arm 2a and its "bottom" driving lane 2aa. While taking into account the aperture angle of the radar sensor 5 and while taking into account the relative alignment of the motor vehicle 1 with respect to the road arm 2a and its "bottom" driving lane 2aa, that swiveling angle is calculated as the attention angle for the radar sensor 5 in the case of which the "bottom" driving lane 2aa of the road arm 2a (particularly its part closest to the planned driving route 3) is contained as well as possible in the receiving range of the radar sensor 5. The thus calculated attention angle is supplied as the desired value to the automatic control of the swiveling angle, whereby the swiveling angle is set to this attention angle.

FIG. 1 shows the resulting alignment of the radar sensor 5. In this case, the main beaming direction 4 is defined by the attention angle. FIG. 1 illustrates that the receiving range of the radar sensor 5a resulting from the main beaming direction 4 and the aperture angle (between the boundaries 4a and 4b) of the radar sensor 5 covers the road arm 2a such that, for example, the vehicle 9 approaching on the road arm 2a can be detected by the radar sensor 5. The driver of the motor vehicle 1 can thereby be warned that a vehicle is approaching the planned driving lane from the left.

Figure 2:
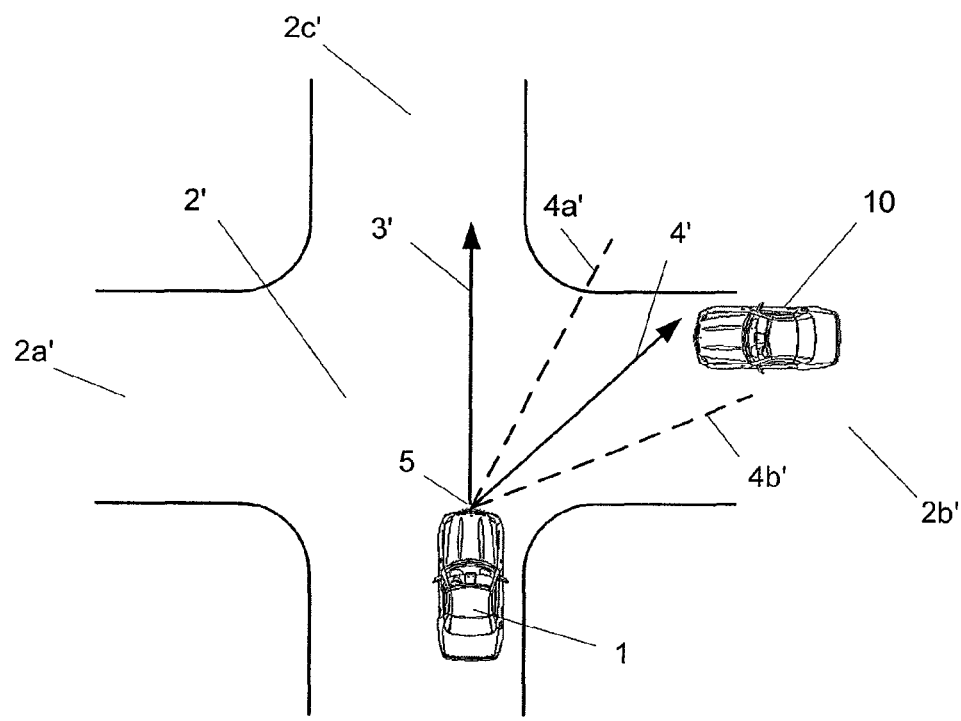
FIG. 2 is a schematic view of the use of a method according to the invention in a second driving situation.

FIG. 2 shows the same motor vehicle 1 in a different driving situation, specifically when approaching an intersection 2. In the driving situation illustrated in FIG. 2, the planned route of the actual destination targeting and the fact that no turn signal is activated indicate that the vehicle 1 will probably drive straight ahead across the intersection 2. The arrow 3' clearly shows the planned driving route.

By means of the motor vehicle position, the actual vehicle speed and the map data of the navigation system, it is again determined by the method according to the invention whether at least one traffic route contained in the map data leads into the driving route which the vehicle will cover within the next 20 seconds.

In a first stage of the process, first three traffic routes are detected for the driving situation illustrated in FIG. 1, on which traffic routes other traffic participants could basically approach the planned driving route 3'. These are the intersection arms 2a'(left), 2b' (right) and 2c' (straight ahead).

Vehicles oncoming on the intersection arm 2c' can cross the planned driving route only when, viewed from the planned driving route, they turn off to the left. However, since they would have to observe the right of way of the motor vehicle 1 in this case and it is assumed in the embodiment of the invention described here that all traffic participants follow the rules, the intersection arm 2c' may be disregarded. In a second stage of the process, this intersection arm 2c' can therefore be rejected as a leading-in traffic route.

The two leading-in traffic routes 2a' and 2b' remain. The expanded map data indicate that both have the right of way. They should therefore be monitored by the method according to the invention.

The monitoring of the two intersection arms takes place successively. First, a first attention angle is calculated for the radar sensor 5, at which the road arm 2a' can be covered, and the radar sensor 5 is swiveled in the direction of this new attention angle (not shown graphically in a separate manner). Finally, a second attention angle is calculated for monitoring the road arm 2b'. The main beaming direction 4' indicated in FIG. 2 and the aperture angle or receiving range indicated by broken lines 4a' and 4b' correspond to the alignment of the radar sensor 5 with this second attention angle.

The traffic participant 10 is therefore reliably detected by the described method, and the driver of the motor vehicle 1 can be warned.

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of aligning a vehicle sensor, arranged on a motor vehicle and swivelable about at least one axis, the sensor being alignable in a direction of an attention angle determined as a function of an actual driving situation, the method comprising the acts of:
   detecting a presence of a traffic route leading into a probable driving route of the motor vehicle; and
   swiveling the sensor to select the attention angle such that a receiving range of the vehicle sensor when aligned in the direction of the attention angle at least partially contains the traffic route leading into the probable driving route of the motor vehicle,
   wherein, when at least one traffic route leading into the probable driving route is present in a vicinity of the motor vehicle, the sensor is swiveled to select the attention angle such that the probable driving route is not monitored by the sensor, and
   wherein, when no traffic route leading into the probable driving route is present in the vicinity of the motor vehicle, the attention angle is selected such that the receiving range of the vehicle sensor resulting from the alignment largely contains the probable driving route of the motor vehicle.

2. The method according to claim 1, further comprising the act of:
   determining the probable driving route of the motor vehicle via an operating or switching state of a driving direction indication device.

3. The method according to claim 1, wherein the presence of the leading-in traffic route is detected via map data of a navigation system.

4. The method according to claim 1, wherein the probable driving route and the presence of the leading-in traffic route are determined by map data of a navigation system.

5. The method according to claim 1, wherein:
   foreknowledge concerning traffic control is used for detecting the presence of the traffic route leading into the probable driving route; and
   the foreknowledge concerning traffic control comprises at least one of known right-of-way rules, presence of traffic lights, or a switching state of the traffic lights.

6. The method according to claim 3, wherein:
   foreknowledge concerning traffic control is used for detecting the presence of the traffic route leading into the probable driving route; and
   the foreknowledge concerning traffic control comprises at least one of known right-of-way rules, presence of traffic lights, or a switching state of the traffic lights.

7. The method according to claim 1, further comprising the acts of:
   determining an absolute motor vehicle position; and
   determining a relative alignment of the motor vehicle with respect to the traffic route leading into the probable driving route based on the absolute motor vehicle position and map data of a navigation system.

8. The method according to claim 3, further comprising the acts of:
   determining an absolute motor vehicle position; and
   determining a relative alignment of the motor vehicle with respect to the traffic route leading into the probable driving route based on the absolute motor vehicle position and map data of a navigation system.

9. The method according to claim 1, wherein the relative alignment of the motor vehicle with respect to the traffic route leading into the probable driving route is determined by independent vehicle sensors.

10. The method according to claim 1, wherein the attention angle is selected such that the receiving range of the vehicle sensor resulting from the alignment contains a part of the traffic route leading into the probable driving route of the motor vehicle that is closest to the motor vehicle.

11. The method according to claim 3, wherein the attention angle is selected such that the receiving range of the vehicle sensor resulting from the alignment contains a part of the traffic route leading into the probable driving route of the motor vehicle that is closest to the motor vehicle.

12. The method according to claim 4, wherein the attention angle is selected such that the receiving range of the vehicle sensor resulting from the alignment contains a part of the traffic route leading into the probable driving route of the motor vehicle that is closest to the motor vehicle.

13. The method according to claim 1, wherein the swivelable vehicle sensor is only aligned with the traffic route leading into the probable driving route of the motor vehicle if, by way of a distribution of responsibility provided between several vehicle sensors, the swivelable vehicle sensor is responsible for its monitoring.

14. The method according to claim 3, wherein the swivelable vehicle sensor is only aligned with the traffic route leading into the probable driving route of the motor vehicle if, by way of a distribution of responsibility provided between several vehicle sensors, the swivelable vehicle sensor is responsible for its monitoring.

15. The method according to claim 9, wherein the swivelable vehicle sensor is only aligned with the traffic route leading into the probable driving route of the motor vehicle if, by way of a distribution of responsibility provided between several vehicle sensors, the swivelable vehicle sensor is responsible for its monitoring.

16. The method according to claim 1, wherein the traffic route leading into the probable driving route has right-of-way over the probable driving route.

* * * * *